United States Patent [19]
Kuenen

[11] Patent Number: 5,836,240
[45] Date of Patent: Nov. 17, 1998

[54] OVEN WITH HOT AIR GUIDE

[75] Inventor: Hendrikus Antonius Jacobus Kuenen, Overloon, Netherlands

[73] Assignee: Koppens B.V., Bakel, Netherlands

[21] Appl. No.: 850,514

[22] Filed: May 2, 1997

[30] Foreign Application Priority Data

May 3, 1996 [NL] Netherlands ............................ 1003027

[51] Int. Cl.$^6$ .............................. A47J 37/00; A21B 1/00; F27B 9/00; F24C 15/32

[52] U.S. Cl. ........................... 99/443 C; 99/386; 99/476; 99/479; 126/21 A; 432/58; 432/121; 432/138; 432/143

[58] Field of Search .............................. 99/352–355, 386, 99/443 R, 443 C, 476, 477–479; 34/75, 78, 147, 207, 203; 62/381; 126/21 A, 21 R; 198/778, 883; 219/388; 432/121, 143–145, 147, 2, 14, 58, 133, 138

[56] References Cited

U.S. PATENT DOCUMENTS 4,118,181 10/1978 Onodera .
5,078,120 1/1992 Hwang ................................. 126/21 A
5,322,007 6/1994 Caridis et al. ......................... 99/443 C
5,329,916 7/1994 Lygum ................................. 99/479 X
5,702,245 12/1997 London ................................. 432/14

FOREIGN PATENT DOCUMENTS 0 558 151 9/1993 European Pat. Off. .
1566750 5/1969 France .
85 22 780.3 10/1985 Germany .

*Primary Examiner*—Timothy F. Simone
*Attorney, Agent, or Firm*—Young & Thompson

[57] ABSTRACT

An oven for preparing food products comprises a housing, a conveyor belt which is movable through the housing and on which the food products can be arranged, which conveyor belt follows a helical path, heating elements and booster devices for generating a stream of hot air through the housing in connection with heating the food products arranged on the belt. In the housing there are guide elements for guiding the stream of hot air over the belt in such a way that the products are uniformly heated in the transverse direction of the belt.

9 Claims, 2 Drawing Sheets

5,836,240

OVEN WITH HOT AIR GUIDE

FIELD OF THE INVENTION

The invention relates to an oven for preparing food products, comprising a housing, a conveyor belt which is movable through the housing and on which the food products can be arranged, which conveyor belt follows a helical path, heating means and booster means for generating a stream of hot air through the housing in connection with heating the food products arranged on the belt.

BACKGROUND OF THE INVENTION

An oven of this type is known. The food products, such as meat, chicken, potato dishes, vegetables and the like, are cooked through and browned in said oven by exposure to the hot air. The oven is particularly suitable for large production capacities and also for products which require relatively long cooking times.

In order to obtain uniform production it is extremely important that all products are given the same treatment. However, the hot air is not supplied to all locations to the same degree. Moreover, the products on the inside of the belt are located closer to one another than are those on the outside of the belt, which reduces the accessibility for the hot air.

SUMMARY OF THE INVENTION

The aim of the invention is, therefore, further to improve the oven described above. This aim is achieved in that guide means are present in the housing for guiding the stream of hot air over the belt in such a way that the products are heated uniformly in the transverse direction of the belt.

Since the products all remain in the oven for an equal length of time, a uniform result is ensured if the conditions in the oven remain constant and products located next to one another are given the same treatment. The consequence of this is that the products all have approximately the same core temperature when they leave the oven, which is advantageous for the product quality and costs less energy.

Since a certain, minimum core temperature is always required for the desired cooking through, this means that it is no longer necessary to supply so much energy to achieve said minimum core temperature that some products have become hotter than is necessary.

The guide means are located above the belt at a distance such that the products on the belt are able to move along underneath the guide means. With an embodiment of the conveyor belt wherein several windings are located above one another, this means that the guide means are located immediately beneath the upper winding, leaving a gap through which the hot air can be supplied.

Preferably, the guide means comprise at least one plate which runs parallel to the belt some distance above it. Usually the belt comprises several windings above one another, in which case a plate located between two windings is some distance away from the upper winding, leaving a gap for feeding through hot air.

In the known oven, the feed means for supplying the hot air from the booster are located on the outside of the helical path. According to the invention, provision is now made for each plate to be narrower than the belt and to extend in the transverse direction of the belt from said outside. This prevents a situation where the air which reaches the products located on the inside of the belt after it has flowed over the products located on the outside of the belt has cooled off too much to produce good heating of the former products. This is because the air now flows over the plate towards those products located on the inside of the belt, as a result of which said products can also be supplied directly with hot air which has not yet cooled down.

In order to prevent a situation where cooling of the air would nevertheless occur because hot air would flow through underneath the plate, each plate has on the outside a skirt which is directed downwards towards the belt. In this context each plate can have a baffle directed upwards at its front and/or rear end.

In order further to improve guiding of the hot air, the feed means can form a tube which runs parallel to the axis of the helix and is open on the side facing the helical path, and the plates can extend along said open side.

In the case of the known oven, the innermost edge of the belt is accommodated on the outside of a drum which has a vertical axis. According to the invention, the outermost edge of the belt can be at least partially surrounded by a correspondingly curved jacket plate beyond the peripheral region of the belt where the plates are located.

BRIEF DESCRIPTION OF THE DRAWINGS

An illustrative embodiment of the oven according to the invention will now be explained in more detail with reference to the figures.

DETAILED DESCRIPTION OF THE INVENTION

Figure 1:
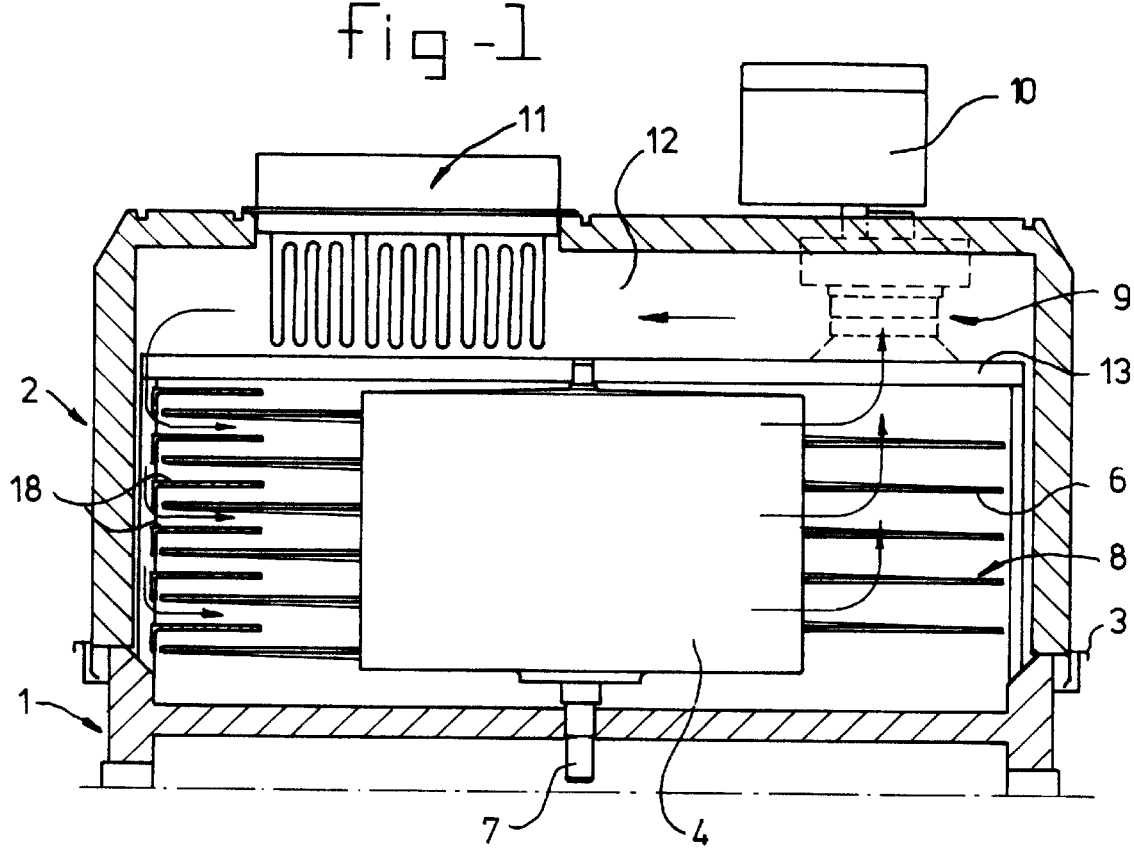
FIG. 1 shows a cross-section along I—I in FIG. 2, according to the invention.

The oven shown in the figures comprises a base frame 1 over which a cover 2 is placed. The cover 2 can be lifted relative to the base frame 1 by means of known lifting means, which are not shown. Base frame 1 and cover 2 are sealed with respect to one another by means of water lock 3.

Two drums 4, 5 are arranged inside the oven. The conveyor belt, which is indicated in its entirety by 8, is guided helically around the exterior of each drum 4, 5 by means of helical supports 6 arranged around the exterior of the drums. The drums can be driven by means of synchronized drive motors, connected to the shafts 7, which are supported in the base frame 1.

Boosters 9, which can be driven by means of motors 10 arranged outside the cover, are arranged in the cover. The boosters draw in the air in accordance with the arrows shown in FIG. 1 and force said air over the heating installation 11. During this operation the air is heated, and, via the heating installation 11, the air reaches the products which are located on the conveyor belt 8, likewise as shown in FIG. 1.

Figure 2:
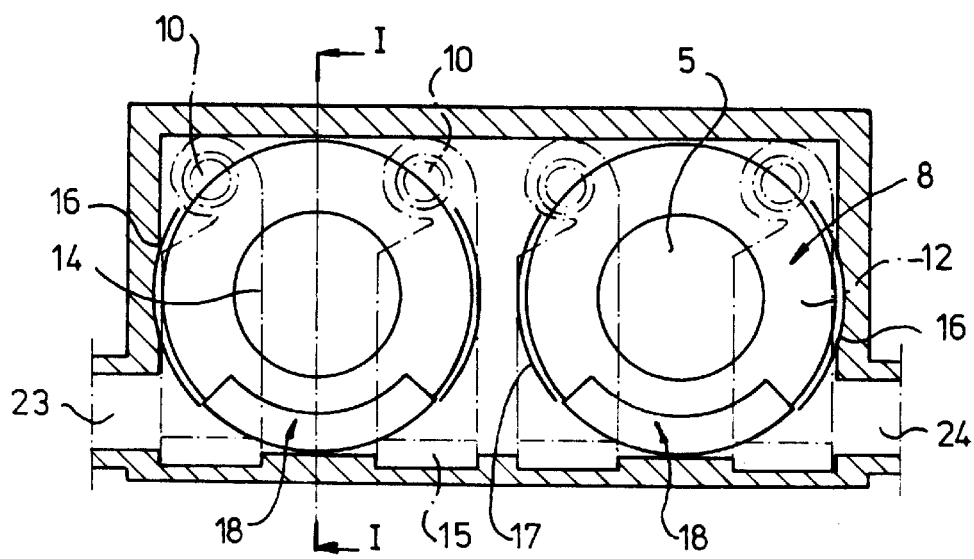
FIG. 2 shows a top, cross-sectional view of the oven.

The duct through which the air flows from the boosters 9 to the associated heating installation 11 is indicated by 12. The duct is delimited at the top by the cover 2 and at the bottom by plate 13, whilst the side boundary 14 of the ducts concerned can be seen in FIG. 2. The discharge of the ducts downwards is indicated by 15; from the mouth 15, the air passes into a vertical tube which is delimited by the walls of the cover 2 and the windings.

Figure 3:
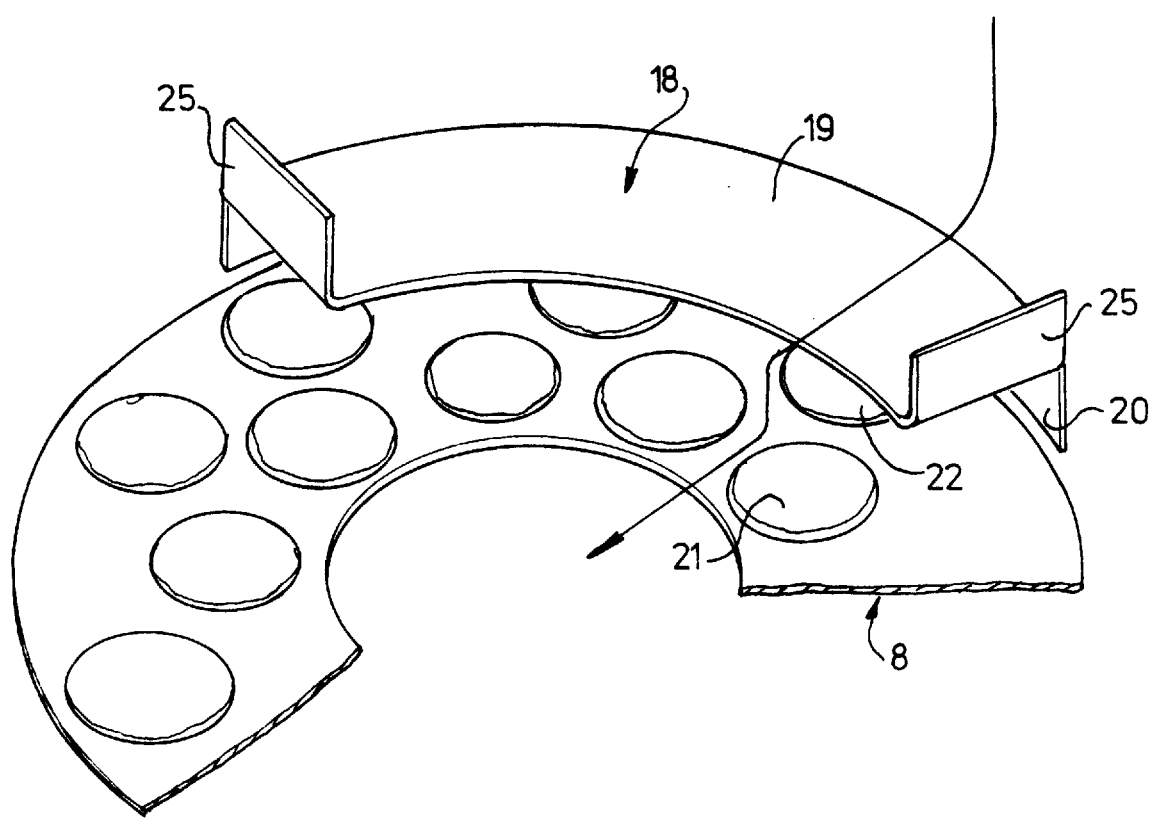
FIG. 3 shows a detail of the belt with guide plate according to the invention.

Jacket plates 16, 17 are mounted around the outside of each helically wound section of the belt 8. In the vicinity of the mouth of duct 12 the windings, which are located above one another, of the helical sections of the belt 8 are covered by a guide element, which is indicated in its entirety by 18, as is also shown in FIG. 3.

Each guide element 18 consists of a curved plate 19 which runs approximately parallel to the belt surface and a skirt 20. The hot air discharged through the mouth 15 flows over the plate 19 and then comes into contact with the products 21 located on the inside of the winding of the belt 8. The products 21 are now supplied with hot air which has not yet been cooled down by the products 22 located further towards the outside. As a result, uniform heating of all products on the belt is ensured: this is because a situation is now prevented where the products 21 located on the inside are supplied with air which has already been cooled by the products 22 located on the outside. The products 21, 22 are heated in the same way over the remainder of the path of each winding, that is to say beyond the plates 18, such that no temperature differences between products located alongside one another on the belt occur over the path from the feed 23 to the discharge 24 from the conveyor belt 8.

The guide elements can also be provided with upright baffles 25 located at the ends, which baffles make further advantageous guiding of the hot air possible.

I claim:

1. In an oven for preparing food products, comprising:

a housing;

a conveyor belt for supporting food products, said conveyor belt structured and arranged to move through the housing in a helical path;

heating means for generating a stream of hot air through the housing for heating food products arranged on the belt;

booster means for drawing air in the housing and conveying said air to the heating means;

the improvement wherein guide means are operatively arranged in the housing for guiding the stream of hot air over the belt in such a way that the products are heated uniformly in a transverse direction of the belt.

2. The oven according to claim 1, wherein the guide means are located above the belt at a sufficient distance such that the products on the belt are able to move along underneath the guide means.

3. The oven according to claim 2, wherein the guide means comprise at least one plate which runs approximately parallel to the belt some distance above the belt.

4. The oven according to claim 3, wherein the belt has several windings above one another, and a plate located between two windings is some distance away from the upper winding, leaving a gap for feeding hot air therethrough.

5. The oven according to claim 3, further comprising feed means inside the housing for feeding the hot air from the booster to outside of the helical path, and wherein each plate is narrower than the belt and extends in the transverse direction of the belt from the outside.

6. The oven according to claim 5, wherein each plate has on an outer edge, a depending skirt which is directed downwardly towards the belt.

7. The oven according to claim 3, wherein each plate has a front end and a rear end, and a baffle directed upwardly at at least one of its front and rear ends.

8. The oven according to claim 5, wherein the feed means form a tube which runs parallel to the axis of the helix and is open on the side facing the helical path, and the plates extend along the open side.

9. The oven according to claim 8, wherein the belt has an innermost edge and an outermost edge, the innermost edge being accommodated on the outside of a drum having a vertical axis, and the outermost edge of the belt being at least partially surrounded by a correspondingly curved jacket plate beyond a peripheral region of the belt where the plates are located.

* * * * *